R. R. SAVOY.
DRAFT RIGGING FOR WAGON TONGUES.
APPLICATION FILED MAY 19, 1914.
1,124,961.
Patented Jan. 12, 1915.
2 SHEETS—SHEET 1.
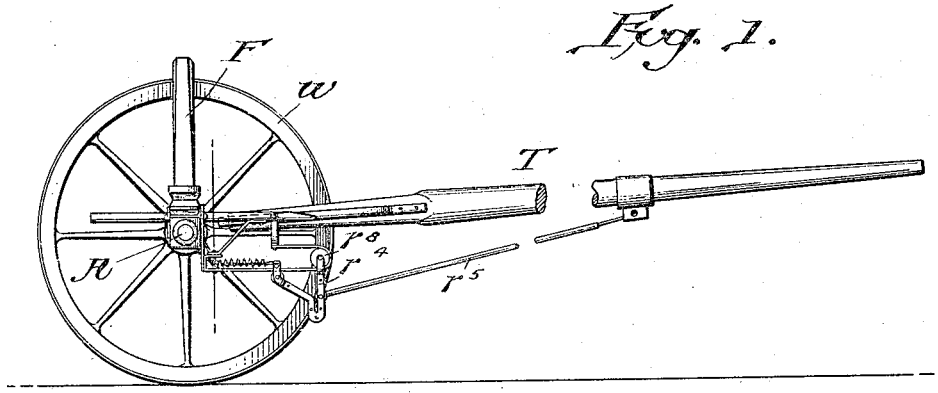
Fig. 1.
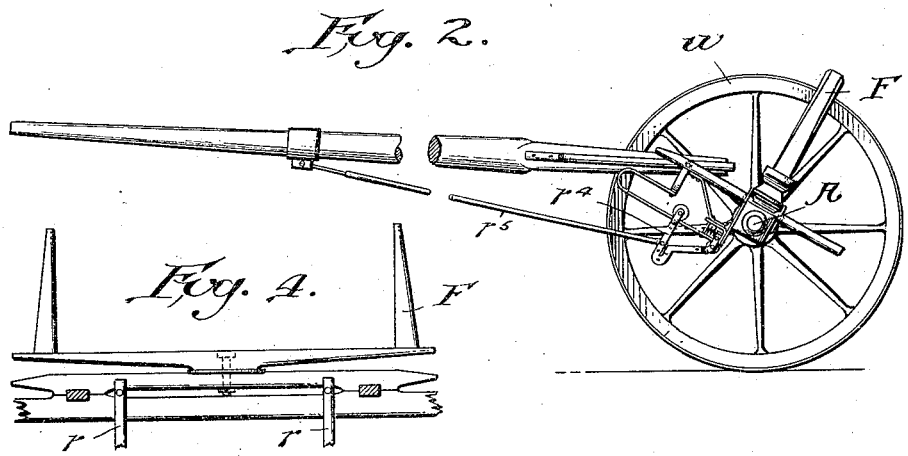
Fig. 2.
Fig. 4.
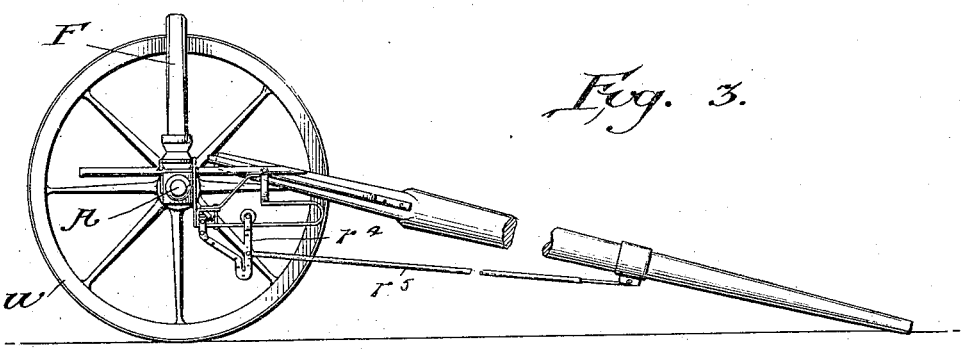
Fig. 3.
Witnesses
Inventor
Robert R. Savoy
By Edward E. Clement
Attorneys R. R. SAVOY.
DRAFT RIGGING FOR WAGON TONGUES.
APPLICATION FILED MAY 19, 1914.
1,124,961.
Patented Jan. 12, 1915.
2 SHEETS—SHEET 2.
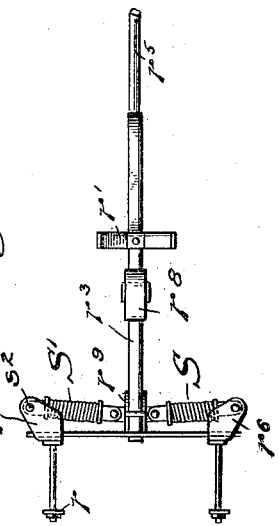
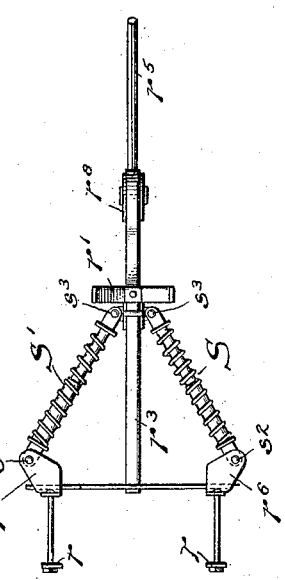
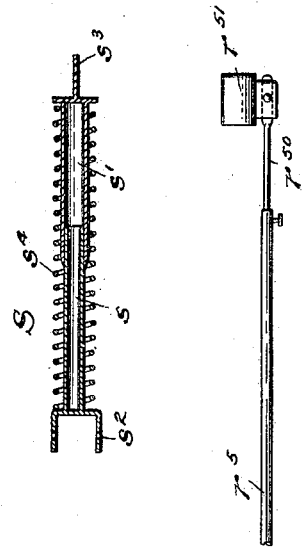
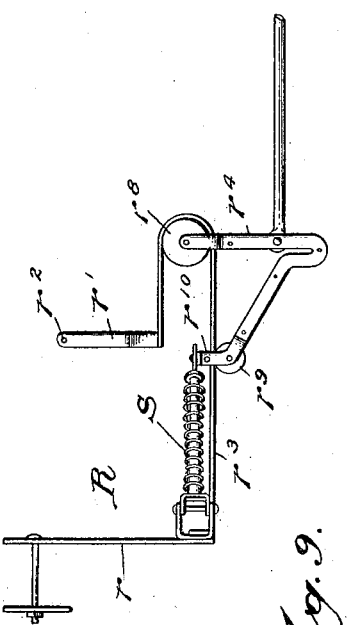
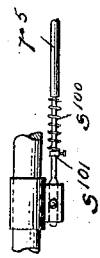
Witnesses
Inventor
Robert R. Savoy
By Edward E. Clement
Attorneys

UNITED STATES PATENT OFFICE.

ROBERT R. SAVOY, OF MACKSVILLE, KANSAS.

DRAFT-RIGGING FOR WAGON-TONGUES.

1,124,961. Specification of Letters Patent. Patented Jan. 12, 1915.

Application filed May 19, 1914. Serial No. 839,593.

*To all whom it may concern:*

Be it known that I, ROBERT R. SAVOY, a citizen of the United States, residing at Macksville, county of Stafford, State of Kansas, have invented certain new and useful Improvements in Draft-Rigging for Wagon-Tongues, of which the following is a specification, reference being had therein to the accompanying drawing.

My invention relates to draft apparatus for vehicles and especially to spring mechanism for wagon tongues.

My invention has for its object the production of means whereby a wagon tongue may be normally supported without strain on the draft animals, may be dropped to the ground when desired by simple pressure, and will permit the dumping or upturning of the wagon or other device to which it is attached, without upward strain upon the draft animals or displacement of their harness.

I attain my object by connecting the tongue pivotally to the vehicle, and connecting to it an oppositely working pair of spring devices pivoted so as to reverse their effect when the tongue is lowered or the vehicle upturned.

My invention is illustrated as to one embodiment in the accompanying drawings, in which—

Figure 1 is a side elevation showing the front gear of a wagon with one wheel removed and the tongue attached thereto by means of my invention, in normal draft position. Fig. 2 is an opposite elevation showing the wagon body inclined to dump. Fig. 3 is an elevation similar to Fig. 1 showing the tongue dropped and the wagon body normal. Fig. 4 is a detail showing the mode of attachment for the rigging of the tongue. Figs. 5, 6, 7 and 8 are detail figures showing the rigging detached. Fig. 9 is a similar detail view of a spring connection for the tongue.

Referring to the drawings, T represents a wagon tongue attached through the rigging of my invention to the front axle A of a wagon not shown except as to one front wheel W and the body frame F. This tongue is shown in Fig. 1 in normal position, that is to say substantially horizontal. Wagon tongues of ordinary construction are permanently fixed in this position, with the result that certain inconveniences and even dangers are experienced which by means of my invention are completely avoided. One of the inconveniences is that of being unable to lead or back the draft animals into position to or from the side, whereby one of them would have to step over the tongue. This might be done with an ordinary tongue however, if it were pivotally connected to the axle so it would drop when not supported. Such a construction however would cause the weight of the tongue when in use to be borne constantly by the draft animals, which in practice is bad. A similar result might be attained if the tongue were pivoted with a spring or weight to lift it, but this would cause the tongue normally to assume an upwardly inclined position which would create an upward strain on the draft animals. Another inconvenience which sometimes amounts to danger, if the tongue is rigid, arises when the wagon is on an incline as for example when dumping. A rigid tongue under these conditions would either snap or lift the animals.

To attain my object I provide a rigging R having vertical members $r$—$r'$, the latter bifurcated, to receive the tongue which is pivoted thereto at $r^2$; and a horizontal member $r^3$ forming a slide for the carriage $r^4$ to which is attached a connecting rod $r^5$, and which is normally pressed forward by the springs S—S'. The construction of these springs is best shown in Fig. 6 wherein the telescoping tubes $s$—$s'$ have shouldered terminal pivot members $s^2$—$s^3$ and carry a compression spring $s^4$ with its ends abutting against the shoulders of the terminals. The terminals $s^3$ are pivotally secured to the upturned member $r^{10}$ of the carriage $r^4$, and the terminals $s^2$ of the springs are pivoted in fixed brackets $r^6$ and $r^7$. The carriage $r^4$ is fitted with rollers $r^8$ and $r^9$ traveling on the upper and lower faces respectively of the horizontal member $r^3$ of the frame R. When the carriage $r^4$ is in its extreme right hand position as shown in Figs. 5 and 7, the springs S—S' extend forwardly with the telescoping tubes pushed out, and maintain pressure on the carriage which is communicated through the rod $r^5$ to the tongue, by means of the adjustable extension $r^{50}$, pivotally secured to a collar $r^{51}$ on the tongue. Thus the tongue is maintained under spring pressure in the position in Fig. 1. If a sufficient downward force is applied, the carriage $r^4$ will be pushed to the left as shown in Fig. 3, and the springs will be closely compressed while their tubes are completely telescoped as indicated in Fig. 8. If the tongue is maintained horizontal and the wagon body is tipped backwardly as shown in Fig. 2, the same result is attained, the angle however being somewhat greater between the axis of the tongue and the perpendicular lines of the body. In either case, however, the member $r^{10}$ is forced back so that the terminals $s^3$ of the springs go past center, that is to say past a direct line connecting their outer pivot points $s^2$. Obviously this creates spring pressure in the opposite direction to normal pressure and tends to maintain the parts in position. Otherwise the tongue would tend to rise, and no substantial advantage would be gained over a rigid tongue.

I have disclosed herein what I consider to be the best embodiment of my invention known to me at the present time, but I am aware that a number of changes and modifications may be made in details and non-essential features without departing from the spirit of the invention. For example, instead of the telescoping tubes $s$—$s'$, I may use rods pivoted at their inner ends at $s^3$, and sliding through the brackets $r^6$ and $r^7$ at their outer ends. Instead of the rigging shown, I may also employ a drop bracket and a cross-shaped metal piece with its cross members pivoted to the bracket or the axle and its fore and aft members perforated at their ends for the rods $r^5$ to slide therein. In such case the inner ends of the springs $s^3$ would be pivoted direct to the rod $r^5$ and the carriage $r^4$ would be omitted entirely.

Various other modifications will suggest themselves to those skilled in the art and I wish it distinctly understood that I contemplate all such changes as fall within the scope of the appended claims.

In Fig. 9 I have shown a spring connection between the tongue and the rod $r^5$, in order to take up the jar of the tongue, which is sometimes severe when dumping a load, as for example in an elevator. This spring is marked $s^{100}$, and encircles the telescoping end of the rod, allowing a certain amount of motion between the rod and the tube. $s^{101}$ is a collar with a set screw or equivalent device for holding it, which may be adjusted to stiffen or slacken at the spring.

Having thus described my invention what I claim and desire to secure by Letters Patent is:

1. In draft gear for wagons and the like, a pole pivotally secured to an axle, and means connected to the axle for affording the pole a yielding support, said means comprising a pair of resilient members supplementing each other in effect when the pole is normal and straight, but adapted to automatically oppose each other and neutralize the support when either the pole or the wagon is downwardly inclined to a critical point, substantially as described.

2. In draft gear for wagons and the like, a pole pivotally secured to an axle, and means connected to the axle for affording the pole a yielding support, said means comprising a double compression spring device having fixed abutments and forwardly extending pivotal connections with the pole, said fixed abutments being spaced apart to permit the pivotal ends of the springs to pass between them when the wagon body and pole are relatively inclined at a predetermined angle, substantially as described.

3. In draft gearing for wagons and the like, an axle, a pole pivotally secured so as to have direct draft connection with the axle, a frame carrying a guideway secured to the axle, a carriage adapted to travel on said guideway, connecting means extending from said carriage to a point intermediate of the ends of the pole, whereby movement of the pole up or down will produce travel of the carriage on its guideway and vice versa, and means acting on said carriage to give resilient support to the pole.

4. In draft gearing for wagons and the like, an axle, a pole pivotally secured so as to have direct draft connection with the axle, a frame carrying a guideway secured to the axle, a carriage adapted to travel on said guideway, connecting means extending from said carriage to a point intermediate of the ends of the pole, whereby movement of the pole up or down will produce travel of the carriage on its guideway, and vice versa, and means acting on said carriage to give resilient support to the pole through a predetermined arc of travel with respect to the axle, but adapted to withdraw said support at the end of said arc of travel, whereby the wagon body and pole may remain relatively inclined at a predetermined angle.

5. In draft gearing for wagons and the like, a rigid frame R, having a vertical member $r$ with means for attaching it to an axle of a vehicle, a second vertical member $r'$ bifurcated and adapted to receive a pole with direct draft connections to the axle, a horizontal member $r^3$, a carriage $r^4$ having anti-friction means sliding on the member $r^3$, a pair of compression springs S—S' with associated supporting means, pivotally connected at their outer ends to the upturned member $r^{10}$ of the carriage $r^4$, and a connecting rod $r^5$ secured at one end to the carriage $r^4$ and at the other end to the tongue, substantially as described.

In testimony whereof I affix my signature in presence of two witnesses.

ROBERT R. SAVOY.

Witnesses:
 ABE F. DYCK,
 Mrs. GEO. C. SCHUMACHER.

Copies of this patent may be obtained for five cents each, by addressing the "Commissioner of Patents, Washington, D. C."